United States Patent Office 3,252,513
Patented May 24, 1966

3,252,513
METHOD OF PLUGGING A SUBSURFACE FORMATION USING SILICON TETRACHLORIDE
Billy G. Holmes, Lancaster, Tex., assignor to Socony Mobil Oil Company, Inc., a corporation of New York
No Drawing. Filed May 20, 1963, Ser. No. 281,745
14 Claims. (Cl. 166—29)

This invention relates to a method for reducing the permeability of a calcareous subsurface formation. More particularly, it relates to a method for reducing the influx of water from a calcareous subterranean formation into a wellbore being drilled by gas or air.

It is desirable for various reasons to reduce the permeability of a calcareous subterranean formation. For example, the influx of water from such formation into a wellbore being drilled employing air or gas to remove the cuttings from the wellbore presents a serious problem. The water entering the wellbore causes the cuttings and other debris of the formation to agglomerate. The agglomeration of these materials prevents the most effective use of air or gas drilling. Many methods have been proposed for preventing the influx of water from such formation into the wellbore during air or gas drilling. One of the methods for preventing water influx from the calcareous formation into the wellbore involves blocking or plugging the pore spaces or voids in the formation adjacent the wellbore. The plugging effect can be obtained by precipitation of a water-insoluble material from hydrocarbon-soluble substances positioned in the calcareous formation adjacent the wellbore. Suitable substances are the hydrocarbon-soluble salts of titanium and silicon. Generally, the salts with halide anions of these metals are used. For example, the titanium and silicon chlorides are useful in plugging a formation. These substances react with water in the formation to form water-insoluble hydrated oxides and hydrolysis acid products. The water-insoluble hydrated oxides effectively plug the existing pore spaces of the calcareous formation to obtain a reduction in permeability. However, the hydrolysis acid products, usually mineral acids such as hydrochloric acid, produce an undesirable side effect in creating new pore spaces. The hydrolysis acid products react with the calcareous matter in the formation to produce water-soluble substances. Subsequent water influx through the plugged calcareous formation removes the water-soluble substances. This results in increasing the permeability of the calcareous formation above that otherwise obtained from the plugging action. One solution to this undesirable side effect created by the hydrolysis acid products is to inject an alkali metal base into the formation to neutralize the hydrolysis acid products. For example, sodium or potassium hydroxide may be injected into the calcareous formation to neutralize the hydrolysis acid products as they are formed. Although the undesired effects of the hydrolysis acid products are avoided, the strong alkali metal base creates other problems The reaction of the alkali metal base with the hydrolysis acid products usually includes producing large amounts of the alkali metal halides. These alkali metal halides can create serious problems in the wellbore where muds are subsequently required to complete the wellbore. Further, these materials create corrosion problems on any metallic members exposed to them. Also, any excess of the alkali metal hydroxide carried into the wellbore may produce the same result. For example, any metallic members in the tubing or packer assemblies used in completing the wellbores will be very quickly attacked by these substances. Thus, up to the present this method has not been considered effective to reduce the permeability of the calcareous formation to prevent water influx in a wellbore therein.

Accordingly, it is an object of this invention to provide a method for reducing the permeability of a calcareous subterranean formation without creating any of the above-mentioned deleterious effects. Another object is to provide a method for reducing the permeability of a calcareous formation to prevent the influx of water from such formation into a wellbore provided by air or gas drilling. Another object is to precipitate water-insoluble hydrated oxides as plugging materials from hydrocarbon-soluble salts of the type described while simultaneously preventing the hydrolysis acid products from reacting with the calcareous matter in the formation. Another object is to convert the hydrolysis acid products formed by the precipitation of water-insoluble hydrated oxides as plugging materials of the type described into a material incapable of reaction with calcareous matter without the use of alkali metal bases or without creating their undesired deleterious effects.

The objects of this invention are obtained by prewashing the calcareous formation to be plugged with a solution of water and ammonia. After the prewashing solution of water and ammonia, there is injected a solution containing not more than 10 percent by volume of silicon tetrachloride in a hydrocarbon solvent into the calcareous formation. The prewash solution contains sufficient water to hydrolyze the silicon tetrachloride to the water-insoluble hydrated oxide. This provides a plugging material well suited for reducing the permeability of the formation. The prewash solution also contains sufficient amomnia to neutralize the hydrochloric acid produced by the hydrolysis of the silicon tetrachloride. Thus, by the method of this invention, a plugging material formed by hydrolysis of the silicon tetrachloride is provided and simultaneously, the hydrochoric acid also produced by the hydrolysis is completely neutralized by a weak base which is incapable of providing the undesired deleterious side effects produced by the alkali metal bases.

A detailed description of the present invention directed to the prevention of the influx of water into a wellbore being drilled by air or gas into a calcareous subterranean formation will be given. However, it will be appreciated that the method of this invention can be applied to other situations where it is desired to reduce the permeability of a calcareous formation. The air or gas drilling procedure is interrupted when the influx of water from the calcareous formation causes the cuttings and other debris to ball up, thereby making it difficult to remove them from the wellbore. Continued drilling is usually undesirable at some point because of the danger of plugging the wellbore or the reduced penetration rates become unacceptable. Generally, it will be desirable to adapt the wellbore for injecting various substances directly and solely into the calcareous formation without penetration of the other adjacent formations. For this purpose, various wellbore-contained apparatus, such as tubings and packers, may be used as is well known.

As the first step in the method of this invention, a prewash solution of water and ammonia is injected into the calcareous formation. Usually, the solution of water and ammonia will be in the form of commercial ammonium hydroxide. The commercial ammonium hydroxide usually contains about 28 percent by weight of ammonia. However, a solution of water and ammonia having other ammonia concentrations may be used. For example, solutions of water and ammonia may be prepared in pressurized equipment having greater amounts than 28 percent by weight of ammonia. In some cases such solutions will be desirable where a large amount of the hydrolysis acid product will be encountered. Usually, a solution of water and ammonia having 14 percent by weight of ammonia can be used. A sufficient volume of the solution of water and ammonia will be injected into the calcareous formation to provide certain water and ammonia amounts, which amounts will be hereinafter described. This volume will usually fill the pore spaces of such formation for a small distance about the wellbore where the pressure gradient of the formation fluids is nearly uniform, usually a distance of 5 to 10 feet. The majority of any innate formation fluids will be displaced away from the wellbore as the solution of water and ammonia is dispersed through the formation. This is most desirable where connate water exists to prevent premature reaction of the following solution of silicon tetrachloride and hydrocarbon.

In order to insure dispersing of the solution of water and ammonia into the calcareous formation, the following step may be practiced. A hydrocarbon is injected through the wellbore into the calcareous formation immediately behind the solution of water and ammonia. The hydrocarbon is used in an amount suitable to disperse the solution of water and ammonia away from the wellbore and throughout the area of the calcareous formation within the given distance from the wellbore. Usually, an amount of hydrocarbon equal to between 0.1 and 1.0 pore volume of the area of the formation through which the solution of hydrocarbon and silicon tetrachloride is to be dispersed is adequate. However, the exact amount of the hydrocarbon injected into the formation is not critical inasmuch as any excess will merely flow through the dispersed solution of hydrocarbon and silicon tetrachloride. Further, in some cases it may be desirable that the hydrocarbon be injected in such excess amounts as required to reduce the connate water in the calcareous formation to a minimum amount. Any hydrocarbon may be used. Preferably, the hydrocarbon is a liquid at formation conditions. For example, any hydrocarbons selected in the range of from propane to diesel oil may be used.

As the next step, a slug of a solution containing not more than 10 percent by volume of silicon tetrachloride in a hydrocarbon is injected into the calcareous formation. Solutions containing above 10 percent by volume of silicon tetrachloride produce such localized excessive amounts of hydrochloric acid that neutralization is difficult. Generally, a solution containing between 1 and 5 percent by volume of silicon tetrachloride in a hydrocarbon may be used with acceptable results. Solutions containing less than 1 percent by volume of silicon tetrachloride do not produce sufficient plugging materials to reduce reliably the permeability of calcareous formations. Good results have been obtained with a solution containing 2½ percent by volume of silicon tetrachloride in a hydrocarbon. The slug of the solution of the silicon tetrachloride is used in an amount to produce adequate plugging material to obtain a desired reduction in permeability of the formation. Generally, the volume of the slug of solution need not be greater than the pore volume of the calcareous formation within the area desired to be plugged, for example, between 5 and 10 feet about the wellbore. Any hydrocarbon that is liquid, or made liquid, under the formation conditions may be used. Hydrocarbons in the range of between propane and diesel oil may be used. Any liquid, or formation liquefiable, hydrocarbons having boiling points at atmospheric conditions up to about 500° F. may be used. The hydrocarbon solvents used in the rubber industry, in the formulation of insecticidal sprays, as thinners for paint, as dry cleaning solvents, and for numerous like purposes, may be used. For example, the hydrocarbon solvents sold commercially as the Sovasols (a registered trademark of Socony Mobil Oil Company) may be used with good results. In particular, the Sovasols having boiling points in the range of 115° to 460° F. are especially well suited for preparation of the solutions containing silicon tetrachloride.

The solution of water and ammonia injected in the first step into the calcareous formation intermixes and reacts with the later-injected solution of silicon tetrachloride and hydrocarbon. There is provided by the solution of water and ammonia an excess of water required to hydrolyze the silicon tetrachloride upon contact in the formation. Further, there is adequate ammonia contained in such solution to neutralize the hydrochloric acid produced by the hydrolysis of silicon tetrachloride. The neutralization product is ammonium chloride. The ammonium chloride is very soluble in the excess water contained in the solution of water and ammonia. The ammonium chloride is usually not noxious to any subsequent procedures to be undertaken in the wellbore.

However, a subsequent alternate step of injecting more hydrocarbon from the wellbore into the calcareous formation to push the excess solution of water, ammonia, and ammonium chloride further out into the formation may be practiced, if desired. The hydrocarbon may be any liquid hydrocarbon at formation conditions such as those heretofore described in the preceding steps. There may be situations where the injection of such subsequent quantity of hydrocarbon is desirable. For example, this step may be used to foster more intimate contact between the solution of water and ammonia present in the formation and the solution containing silicon tetrachloride in a hydrocarbon to obtain a maximum production of the plugging material by hydrolysis and neutralization.

The following example of one laboratory test performed at formation conditions will be illustrative of the excellent results obtained with the method of this invention. A limestone formation sample was prepared into a plug 1 inch in diameter and 2½ inches in length. The pore volume of the plug was 8 cubic centimeters and the plug had a measured liquid permeability to water of 0.017 darcy. This plug was cleaned with acetone, dried, and then water saturated. However, no particular effort was made to saturate completely the plug with water. The plug was placed into a pressure cell wherein fluids could be introduced into one end at a pressure up to 500 p.s.i.a. and passed axially through the plug. The plug was flooded with 1.0 pore volume of a solution of water and ammonia wherein the amount of ammonia was 14 percent by weight. Immediately following this solution of water and ammonia there was injected 0.1 pore volume of Sovasol No. 5 (having a 300° F. boiling point). The Sovasol moved the solution of water and ammonia from adjacent the plug's face presented toward the injected solutions and distributed same in the plug intermediate its ends. Immediately thereafter there was injected, as a slug of 1.0 pore volume, a solution containing 2½ percent by volume of silicon tetrachloride in Sovasol No. 5. Thereafter, further amounts of Sovasol No. 5, a total of several pore volumes, were injected into the limestone plug to insure a thorough intermixing of the preceding solutions. Lastly, the permeability of the limestone plug was measured and found to be 1.0 millidarcy with respect to water. By applying the method of this invention, the permeability of the limestone plug was reduced by 94.1 percent. This is more than sufficient to prevent any water or other fluid, such as normally encountered during air or gas drilling, to flow through the limestone formation so as to cause any problem with respect to the agglomeration of cuttings or other debris in a wellbore.

From the foregoing, it will be apparent that there has been herein provided a method well suited for satisfying all of the stated objects of this invention. This description is to be considered as illustrative and not limitative of one preferred and illustrative embodiment of this invention. It will be apparent that persons skilled in the art can make various changes to the described method without departing from the spirit of this invention. It is intended that such changes and adaptations be within the scope of the appended claims, which claims recite the only limitations applicable to the present invention.

What is claimed is:
1. A method for reducing the permeability of a calcareous subterranean formation comprising:
   (a) injecting a solution of water and ammonia into the formation,
   (b) injecting an amount of a hydrocarbon into the formation immediately behind the solution to disperse same into the formation,
   (c) injecting a slug of a solution containing between 1 and 5 percent by volume of silicon tetrachloride in a hydrocarbon into the formation, and
   (d) the first-mentioned solution contains sufficient water to hydrolyze the silicon tetrachloride and sufficient ammonia to neutralize the hydrochloric acid produced by the hydrolysis.

2. The method of claim 1 wherein the hydrocarbon solvent for the silicon tetrachloride is selected from hydrocarbons which are liquids at formation conditions having boiling points up to about 500° F.

3. The method of claim 1 wherein the solution of water and ammonia contains about 14 percent by weight of ammonia.

4. A method for reducing the permeability of a calcareous subterranean formation comprising:
   (a) injecting a solution of water and ammonia into the formation,
   (b) injecting a slug of a solution containing between 1 and 5 percent by volume of silicon tetrachloride in a hydrocarbon into the formation, and
   (c) the first-mentioned solution contains sufficient water to hydrolyze the silicon tetrachloride and sufficient ammonia to neutralize the hydrochloric acid produced by the hydrolysis.

5. The method of claim 4 wherein the hydrocarbon solvent for the silicon tetrachloride is selected from hydrocarbons which are liquids at formation conditions having boiling points up to about 500° F.

6. The method of claim 4 wherein the solution of water and ammonia contains about 14 percent by weight of ammonia.

7. A method for reducing the permeability of a calcareous subterranean formation adjacent a wellbore penetrating said formation comprising:
   (a) introducing 1.0 pore volume into that portion of the formation to be treated adjacent the wellbore of a solution of water and ammonia into the formation,
   (b) introducing an amount of a hydrocarbon less than the 1.0 pore volume set forth in step (a) immediately behind the solution of water and ammonia,
   (c) injecting 1.0 pore volume as defined in step (a) of a slug of a solution containing 2½ percent by volume of silicon tetrachloride in a hydrocarbon into the formation, and
   (d) the first-mentioned solution contains sufficient water to hydrolyze the silicon tetrachloride and sufficient ammonia to neutralize the hydrochloric acid produced by the hydrolysis.

8. A method for preventing the influx of water into a wellbore from a surrounding calcareous subterranean formation comprising:
   (a) prewashing an area of the formation about the wellbore with a solution of water and ammonia,
   (b) injecting a slug of a solution containing silicon tetrachloride which reacts with water to form a water-insoluble hydrated oxide and a hydrolysis acid product into the prewashed area of the formation, and
   (c) the solution of water and ammonia containing sufficient water to hydrolyze the hydrocarbon-soluble material to the water-insoluble hydrated oxide and sufficient ammonia to neutralize the hydrolysis acid product, whereby the permeability of the formation is reduced through the plugging action of the insoluble hydrated oxide and the hydrolysis acid product is prevented from creating voids in the calcareous formation.

9. The method of claim 8 wherein the solution of step (b) is comprised of silicon tetrachloride in a hydrocarbon which is liquid at formation conditions and has a boiling point up to about 500° F.

10. The method of claim 8 wherein an amount of a hydrocarbon less than 1.0 pore volume of the area of the formation set forth in step (a) is introduced into the formation immediately behind the solution of water and ammonia to move same away from the wellbore.

11. In the gas or air drilling of wellbores into calcareous subterranean formations subject to problems caused by the influx of water, the improvement which comprises:
   (a) terminating drilling operations,
   (b) injecting a solution of water and ammonia into the formation subject to the influx of water,
   (c) injecting a slug of a solution containing not more than 10 percent by volume of silicon tetrachloride in a hydrocarbon into the mentioned formation,
   (d) the first-mentioned solution containing sufficient water to hydrolyze the silicon tetrachloride and sufficient ammonia to neutralize the hydrochloric acid produced by the hydrolysis, and
   (e) resuming drilling operations.

12. The method of claim 11 wherein the solution of step (c) contains between 1 and 5 percent by volume of silicon tetrachloride.

13. The method of claim 12 wherein the hydrocarbon solvent for the silicon tetrachloride is selected from hydrocarbons which are liquid at formation conditions and have boiling points up to about 500° F.

14. The method of claim 13 wherein the solution of water and ammonia contains 14 percent by weight of ammonia.

References Cited by the Examiner
UNITED STATES PATENTS

| | | | |
|---|---|---|---|
| 3,055,426 | 9/1962 | Kerver et al. | 166—29 X |
| 3,070,161 | 12/1962 | Kerver et al. | 166—29 |
| 3,087,542 | 4/1963 | Becker et al. | 166—30 |

CHARLES E. O'CONNELL, *Primary Examiner.*